US012792114B2

(12) United States Patent
Manousakis et al.

(10) Patent No.: US 12,792,114 B2
(45) Date of Patent: Nov. 10, 2026

(54) SYSTEMS AND METHODS FOR DATACENTER THERMAL MANAGEMENT

(71) Applicant: Microsoft Technology Licensing, LLC, Redmond, WA (US)

(72) Inventors: Ioannis Manousakis, Redmond, WA (US); Rodrigo Lemos De Assis, Kirkland, WA (US); David Thomas Gauthier, Seattle, WA (US); Brijesh Warrier, II, Bellevue, WA (US)

(73) Assignee: Microsoft Technology Licensing, LC, Redmond, WA (US)

( * ) Notice: Subject to any disclaimer, the term of this patent is extended or adjusted under 35 U.S.C. 154(b) by 391 days.

(21) Appl. No.: 18/277,513

(22) PCT Filed: Feb. 16, 2022

(86) PCT No.: PCT/US2022/016649
§ 371 (c)(1),
(2) Date: Aug. 16, 2023

(87) PCT Pub. No.: WO2022/178026
PCT Pub. Date: Aug. 25, 2022

(65) Prior Publication Data
US 2024/0126352 A1 Apr. 18, 2024

(30) Foreign Application Priority Data
Feb. 16, 2021 (NL) .................................... 2027571

(51) Int. Cl.
*G06F 1/20* (2006.01)

(52) U.S. Cl.
CPC .................................. *G06F 1/206* (2013.01)

(58) Field of Classification Search
CPC ...... G06F 1/206; G06F 9/4893; G06F 9/5094; H05K 7/20836
(Continued)

(56) References Cited

U.S. PATENT DOCUMENTS 6,212,644 B1 * 4/2001 Shimoda ................ G06F 1/206 713/324
2004/0268166 A1 12/2004 Farkas et al.
(Continued)

FOREIGN PATENT DOCUMENTS

EP 3525563 A1 * 8/2019 .......... G06F 9/5094
WO 2016182851 A2 11/2016

OTHER PUBLICATIONS

Foley, Maryj. , "Microsoft South Central US Datacenter Outage takes Down a Number of Cloud Services", Retrieved from: https://www.zdnet.com/article/microsoft-south-central-u-s-datacenter-outage-takes-down-a-number-of-cloud-services/, Sep. 4, 2018, 7 Pages.
(Continued)

*Primary Examiner* — Chun Cao
(74) *Attorney, Agent, or Firm* — Ray Quinney & Nebeker P.C.; John O. Carpenter

(57) ABSTRACT

A method of responding to a thermal management capacity reduction in a datacenter includes obtaining (236) process allocations assigned to a plurality of electronic devices in the datacenter and determining (238) a process priority list based on the process allocations assigned to the plurality of electronic devices. The method further includes monitoring (240) at least one cooling sensor configured to measure a thermal management capacity of a cooling system of the plurality of electronic devices and, in response to detecting a reduction in thermal management capacity, reducing (242) power delivery to at least one electronic device of the plurality of electronic devices based at least partially on the process priority list.

18 Claims, 4 Drawing Sheets

(58) Field of Classification Search
USPC .......................................................... 700/300
See application file for complete search history.

(56) References Cited

U.S. PATENT DOCUMENTS

| | | | | |
|---|---|---|---|---|
| 2011/0107332 | A1 | 5/2011 | Bash | |
| 2014/0022002 | A1 * | 1/2014 | Chua-Eoan ............. | G06F 1/206<br>327/512 |
| 2016/0183406 | A1 * | 6/2016 | Ragupathi .......... | H05K 7/20836<br>700/282 |
| 2019/0033897 | A1 | 1/2019 | Barbier | |
| 2020/0073456 | A1 * | 3/2020 | Nguyen ................ | G06F 1/3296 |
| 2020/0379529 | A1 * | 12/2020 | Le Goff ............... | G06N 3/0442 |

OTHER PUBLICATIONS

"Search Report and Written Opinion Issued in Netherlands Patent Application No. N2027571", Mailed Date: Oct. 18, 2021, 17 Pages.
"International Search Report and Written Opinion Issued in PCT Application No. PCT/US22/016649", Mailed Date: May 27, 2022, 24 Pages.
Sverdlik, Yevgeniy, "Data Center Cooling Outage Disrupts Azure Cloud in Japan", Retrieved from: https://www.datacenterknowledge.com/archives/2017/03/31/data-center-cooling-outage-disrupts-azure-cloud-in-japan, Mar. 31, 2017, 4 Pages.
Communication pursuant to Article 94(3) EPC Received for European Application No. 22706494.6, mailed on Jan. 28, 2026, 08 pages.

* cited by examiner

SYSTEMS AND METHODS FOR DATACENTER THERMAL MANAGEMENT

BACKGROUND

Background and Relevant Art

As information technology equipment has changed, higher cooling capacity solutions are needed to support the computing power for Artificial Intelligence and Machine Learning applications. Air cooling requires airflow to carry away thermal energy from the higher power chips, and a fan failure or blockage can stop airflow to an entire row or rack of devices. Liquid cooled systems using cold plate technology come with a potential failure in leaks causing hardware damage and unsafe working conditions. In both instances, a failure of even a part of the thermal management system can force a shutdown of one or more parts of the datacenter, impacting processing and storage capabilities.

BRIEF SUMMARY

In some embodiments, a method of responding to a thermal management capacity reduction in a datacenter includes obtaining process allocations assigned to a plurality of electronic devices in the datacenter and determining a process priority list based on the process allocations assigned to the plurality of electronic devices. The method further includes monitoring at least one cooling sensor configured to measure a thermal management capacity of a cooling system of the plurality of electronic devices and, in response to detecting a reduction in thermal management capacity, reducing power delivery to at least one electronic device of the plurality of electronic devices based at least partially on the process priority list.

In some embodiments, a system for responding to a thermal management capacity reduction in a datacenter includes a plurality of electronic devices, at least one cooling sensor, a rack manager, and a controller in communication with the rack manager and the at least one cooling sensor. The plurality of electronic devices generates thermal energy. The at least one cooling sensor measures a thermal management capacity of a cooling system of the plurality of electronic devices. The rack manager is in communication with the plurality of electronic devices. The controller includes a processor and a hardware storage device that has instruction stored thereon that, when executed by the processor, cause the controller to perform at least the method described above.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
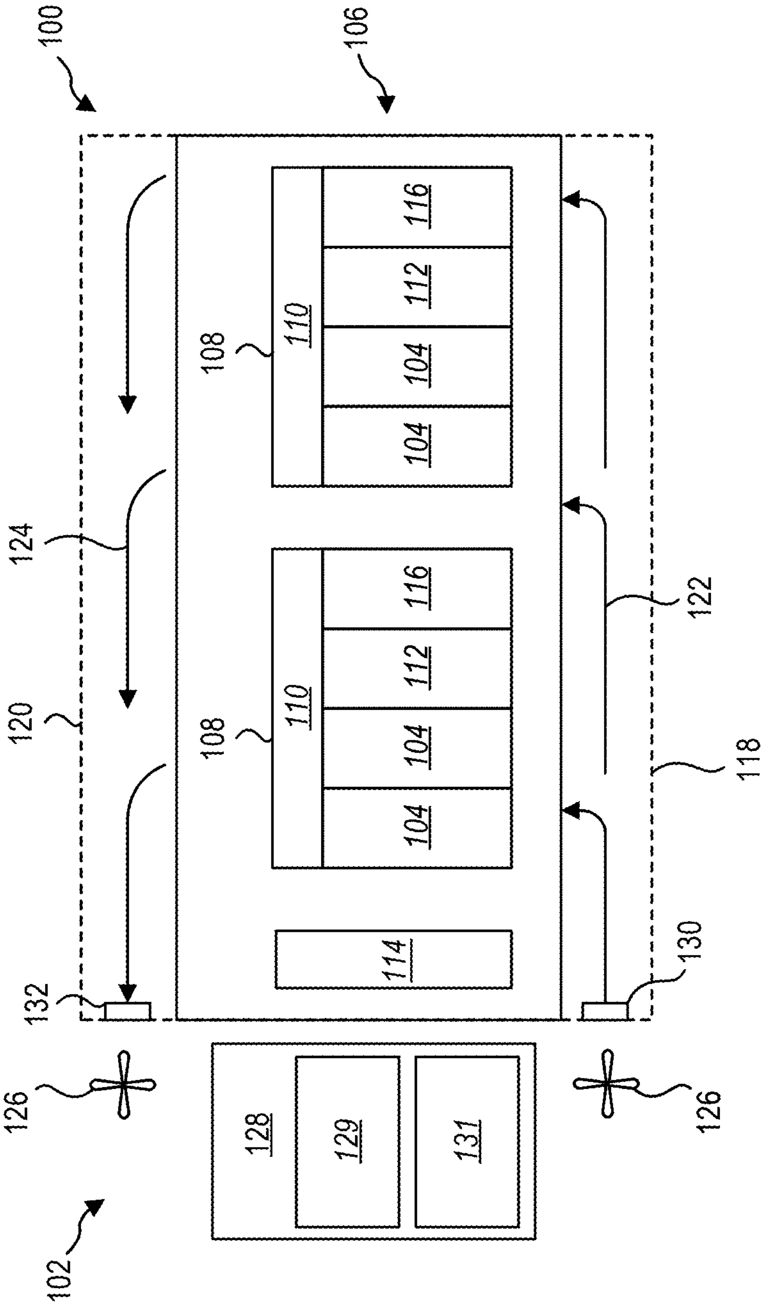
FIG. 1 is a schematic representation of a datacenter with a thermal management system, according to at least some embodiments of the present disclosure.

The present disclosure relates generally to systems and methods for protecting electronic devices from thermal damage. More particularly, the present disclosure relates to devices, systems, and methods for balancing supply and demand of thermal management and workload in a datacenter. In conventional datacenters, electronic devices are shut down, throttled, disabled, or otherwise limited in response to reductions in thermal management capacity of the datacenter. However, the type of workload on different electronic devices may be of different value to the datacenter, and the thermal energy generation of different electronic devices may be different relative to their value to the datacenter. In some embodiments, systems and methods of datacenter workload and thermal management limit and/or prevent impact to the processing and communication capabilities of the datacenter when a reduction in thermal management capacity occurs.

Datacenters include a plurality of electronic devices, some of which are computing devices and some of which are not, that all generate thermal energy. The thermal energy needs to be transported away from the electronic devices to prevent damage to the electronic devices and/or protect the integrity of the data stored or computed on the electronic devices. Datacenters user thermal management systems to carry thermal energy away from the electronic devices by liquid cooling, air cooling, or a combination thereof. Even in liquid cooled systems, the liquid cooling may efficiently conduct thermal energy from the electronic devices but ultimately reject the thermal energy from the warmed liquid (or vapor) into the ambient atmosphere. The warmed ambient air must then be moved from the liquid cooling system and/or the electronic devices to complete the thermal management of the electronic devices.

In some embodiments of datacenters and thermal management systems according to the present disclosure, a plurality of heat-generating devices are located in an enclosed space and air is moved within the space to transfer heat from the heat-generating devices to cool the heat-generating devices. While the present disclosure will describe the use of airflow to cool heat-generating devices directly, such as cooling computing devices, hardware storage devices, networking devices, power supplies, and other electronic devices, it should be understood that the thermal management system may use airflow to cool heat sinks of liquid cooling systems that conduct thermal energy away from the electronic devices. In either example, the reduction of thermal management capacity may be related to a reduction in airflow or air pressure differential across the thermal management system. In the liquid-cooled example, a reduction of thermal management capacity can also be a reduction in liquid flow, such as a failed cooling fluid pump or a blockage in the cooling fluid conduit(s). In either example, a method of reducing workload of the electronic devices in response to a detected reduction in thermal management capacity may be the same.

In some embodiments, a thermal management system according to the present disclosure includes communication between the electronic devices of the datacenter, the thermal management devices of the datacenter, and one or more cooling sensors of the datacenter to balance the supply and demand of thermal management within the datacenter while minimizing impacts to the processing and storage capabilities of the datacenter when a reduction in cooling capacity is detected. The thermal management system communicates with the electronic devices of the datacenter to create and dynamically maintain one or more priority lists for shutdown or restoration of electronic device workload. The priority lists can include a process priority list where higher value or foundational processes upon which other processes depend are granted a higher priority and kept running while other processes are shut down. The priority lists can include a hardware priority list in which an electronic device that is more susceptible to thermal damage may be shut down before (and restored after) another electronic device that can safely continue operating in elevated temperatures. For example, a power supply may be able to continue operating safely at higher temperatures (e.g., above 90° C.) than a computing device, which may experience damage to the processors at the same or lower temperatures (e.g., about 80° C.).

The electronic device workload should be understood to be any electronic processes that generate thermal energy. For example, the electronic device workload of a computing device includes computational workload. A reduction in electronic device workload of the computing device can include shutting down the computing device to substantially stop the computational workload or throttling the processors of the computing device to reduce the possible computational workload. In another example, the electronic device workload of a power supply includes power conversion and/or delivery to another electronic device. A reduction in electronic device workload of the power supply can include shutting down the power supply to substantially stop the power supply workload or reducing the power demand on the power supply (e.g., shutting down server blades powered by the power supply) to reduce the power supply workload. The electronic device workload is related to the thermal energy generation of the electronic device, but each electronic device may generate different amounts of thermal energy relative to a respective power draw. For example, a first computing device may generate more thermal energy while drawing 500W than a second computing device while drawing 500W.

The thermal management system balances the thermal energy generation of the electronic devices with the cooling capacity of the thermal management system according to the priority list(s). The cooling capacity of the thermal management system is related to the location and capacity of a plurality of thermal management devices in the system.

In some embodiments, the thermal management system determines the cooling capacity directly through communication with the thermal management devices. The thermal management system may also determine the cooling capacity of the thermal management system through indirect measurements from cooling sensors. For example, the cooling sensors may include air pressure sensors used to measure an air pressure differential between a hot aisle and a cold aisle of the datacenter. In some examples, the cooling sensors include temperature sensors in or on the electronic devices. In some examples, the cooling sensors include temperature sensors in or on the racks housing the electronic devices. In some examples, the cooling sensors include temperature sensors in the rooms of the datacenter to measure ambient temperatures in the datacenter. In some examples, the cooling sensors include temperature sensors in the hot and/or cold aisle to measure temperature and/or temperature differentials.

In some embodiments, the cooling sensors further include environmental sensors that do not measure the cooling capacity but measure additional environmental factors that affect the priority list for shutting down electronic device workload or restoring electronic device workload. For example, an environmental sensor may be a humidity sensor that measures the ambient humidity at or near the electronic components. The humidity can inform the thermal management system of condensation risks during temperature changes in the datacenter. While ambient humidity has comparatively little impact on the thermal management of the electronic devices during operation, condensation during more rapid changes in temperature can produce droplets, which can short the electronic devices.

In some embodiments, a method of thermal management according to the present disclosure includes a process priority list based on a process inventory of the known processes running on the computing devices. The resource manager or other electronic device in communication with the resource manager may collect hardware identifications for the plurality of electronic devices. Additionally, the system inventory can include a device inventory that includes hardware identifications and/or device dependency information for electronic devices in the system. For example, an IT inventory accessible by a resource manager may include information regarding the device dependencies between computing devices and power supplies where the computing devices depend upon the power supplies for electrical power. In another example, the device dependencies may include networking devices and computing devices where the computing devices depend upon the networking devices for communication with a network. A SKU document accessible by the resource manager may contain power and cooling expectations for a given device. In at least one embodiment, the SKU document contains curve data for thermal management devices of the thermal management system. The process priority list may consider device dependency information to determine what computing, storage, networking, power supply, or other processes to prioritize in operations over other processes.

The process priority list may be classified by tiers to allow faster and easier identification of relative priorities. In some embodiments, the process priority list may include at least 3 tiers. In some embodiments, the process priority list may include at least 5 tiers. In some embodiments, the process priority list may include at least 7 tiers.

In some examples, tiers of the process priority list include one or more of power supply and/or management, networking, control plane, storage, high priority third party computational, low priority third party computational, first party, and flexible or fluid redundant processes. A redundant process is a process or set of processes that are hosted in the datacenter or across multiple datacenters that attempts to guarantee uptime and availability of the process for 99.9% or 99.999% of a given time period (typically per year). As redundant processes are commonly distributed across multiple racks, rows, or datacenters, inherent redundancy is engineered into the process to migrate or reallocate the processes to other racks, rows, or datacenters. In some embodiments, such flexible and/or fluid processes are considered the lowest priority for a controlled shutdown, as backup machines and locations are known to exist for those processes.

In some embodiments, first party computation and/or storage is considered a second-lowest priority. In embodiments where the datacenter is hosting a mixture of first- and third-party computation processes and/or data storage, the first party computation and/or storage may be considered lower priority than third party computation and/or storage. For example, a co-location datacenter may host third party computation and/or storage for contracted parties along with first party computation and/or storage for the owner or operator of the datacenter. The first party may be easier to notify and/or migrate the computation and/or storage to another rack, row, or datacenter because the first party is directly operating the datacenter. The third party has no control over the operations of the datacenter and trusts the first party to ensure the computation and/or storage of the contracted data. For that reason, third party computation and/or storage may be considered higher priority than the first party computation and/or storage.

In some embodiments, the third-party computation and/or storage is divided into two tiers to allow the third-party computation and/or storage to be handled more modularly, since a co-location datacenter may handle a large amount of third-party computation and/or storage. The low priority third-party computation and/or storage and the high priority third-party computation and/or storage may be designated based on the availability of migration or backup of the third-party computation and/or storage. For example, similarly to the redundant processes described herein, the low priority third-party computation and/or storage may include computation and/or storage that has known redundancy or backup. In that regard, a low priority or high priority designation may be related to availability of other machines and independent of the importance of the computation and/or storage.

The control plane is used to manage resources within an account or subscription in the datacenter. In some embodiments, the control plane is used to create a virtual machine or a storage account. As the control plane is the underlying system that allows for the allocation of computation and/or storage, the control plane may be considered of higher priority than the computation and/or storage tiers.

In some embodiments, networking is the highest priority tier in the process priority list (aside from power delivery and management) as all computation and/or storage processes and operations depend upon the networking of the virtual machines and storage to operate. In some embodiments, power delivery and power management devices are not included in the process priority list because no processes are possible without power delivered to the electronic devices, and hence may be considered of threshold priority (e.g., higher priority that any process) because power delivery and management must happen for any of the other process priority tiers to be available.

The hardware priority list may include power delivery and management, as the power supplies and power management devices may be selectively shutdown or restricted in relation to available cooling capacity and/or susceptibility to thermal damage in the event of a cooling capacity reduction or loss. For example, operating the power supplies and/or power management devices in an elevated temperature environment may damage the power supplies and/or power management devices. In particular, power supplies and/or power management devices commonly generate a large amount of heat. The power supplies and/or power management devices may rise in temperature rapidly in the absence of sufficient thermal management, causing damage to the power supplies and/or power management devices that limits and/or prevents the operation of dependent devices.

In some embodiments, the hardware priority list includes thermal susceptibility information for some or all electronic devices in the datacenter that are cooled by the thermal management system. For example, whereas third-party high priority storage may be a relatively high priority tier of the process priority list, some of the third-party high priority storage may occur on hardware that is susceptible to thermal damage. In at least one example, a solid-state drive (SSD) may experience data corruption at elevated temperatures, even before the hardware fails. In some embodiments, the hardware priority list may indicate to the system and/or initiate a process to migrate the third-party high priority storage to another storage device (e.g., platen-based magnetic storage) that is less thermally susceptible before the SSD rises above a pre-determined critical temperature for data integrity.

In some embodiments, the hardware priority list includes the

In some embodiments, the hardware priority list includes humidity and/or moisture susceptibility information for some or all electronic devices in the datacenter that are cooled by the thermal management system. In some embodiments, one or more of the electronic devices is more susceptible to moisture or humidity damage than other devices. As described herein, rapid changes in temperature and/or humidity in the datacenter can produce condensation or other moisture in or on the electronic devices. In some examples, a liquid-cooled electronic device may be substantially waterproof to protect against leaks from the liquid cooling system. In such examples, those devices may be positioned lower on a hardware priority list than other electronic devices that are more vulnerable to liquid damage from condensation.

The hardware priority list and the process priority list, in some embodiments, agree and order the device priorities during a thermal management capacity reduction or failure the same. In some embodiments, the hardware priority list prioritizes the shutdown (or powering on) of certain electronic devices in a different order than the process priority list. In such embodiments, the hardware priority list and the process priority list are synthesized into a single dynamic priority list, in which the processes are prioritized in context of the hardware upon which the processes run. For example, the dynamic priority list can prioritize the processes based on the designated priority tiers (e.g., the 7 tiers described herein, or another set of priority tiers) unless the priority of the processes conflicts with the dependencies or the hardware priority list. In some embodiments, the dependencies include process dependencies (although most process dependencies are factored into the process priority list) and device dependencies.

Because many processes can be allocated to different virtual machines quickly and may be distributed between multiple machines, the system changes too quickly for a person or persons to track. While the priority tiers may be predetermined, the actual dynamic priority list will change the priority of certain processes based on the device to which the process is allocated. In some embodiments, the dynamic priority list changes based on the type of thermal management capacity reduction.

In some embodiments, the dynamic priority list is determined and dynamically modified by a resource manager in data communication with one or more row managers, rack managers, cooling sensors, thermal management devices, and other electronic devices of the datacenter. The resource manager can receive datacenter telemetry to determine the demands of the thermal management system. The datacenter telemetry can include information about the thermal management system performance and/or cooling capacity. The information about the thermal management system performance and/or cooling capacity can originate from one or more cooling sensors. In some embodiments, a cooling sensor is an environmental sensor, such as a temperature sensor, humidity sensor, air pressure sensor, particulate sensor, or other sensor that measures a property of the air or environment in the datacenter. In some embodiments, the cooling sensor is a thermal management device sensor, which measure a property or performance of at least one thermal management device in the thermal management system.

An environmental sensor may measure an inlet temperature, which reflects the temperature of incoming air. An environmental sensor may measure an outlet temperature, which reflects the temperature of outgoing air. The temperature gradient between incoming and outgoing air may indicate the efficiency of thermal energy removal from the electronic devices of the datacenter. In some embodiments, the environmental sensor(s) includes an air pressure sensor or air pressure differential sensor to measure a difference in air pressure across a row or rack and/or between a cold aisle and a hot aisle. The air pressure differential can indicate the rate or mass of airflow through the row or rack and/or between the cold aisle and the hot aisle. In some embodiments, the environmental sensor includes a flowmeter to measure the amount of or rate of air flow through the row or rack and/or between the cold aisle and the hot aisle.

In some embodiments, the cooling sensor(s) according to the present disclosure includes thermal management device sensors. The thermal management device sensors may directly measure the performance and/or properties of components of the thermal management system. In contrast to the environmental sensors, the thermal management device sensors measure properties of the components of the thermal management system to inform a resource manager or operator of the performance of the components of the thermal management system, such as fan speed or liquid cooling fluid flowrate, independently of the temperature, humidity, air pressure, flowrate, etc. This can assist or allow the resource manager or operator to identify the source of or type of cooling capacity reduction or loss.

For example, if the thermal management device sensors indicate that the fan(s) of the thermal management system is operating at an expected fan speed or revolutions per minute (RPM), but the environmental sensors indicate a reduction in pressure differential and/or flowrate, a blockage in the airflow to or from the fan(s) is likely. In another example, if the environmental sensors indicate a rising temperature at a server rack, and the thermal management device sensors indicate that one of a plurality of fans of the thermal management system has stopped, the resource manager can determine the amount of reduction in thermal management capacity based upon the known loss in airflow supply. In embodiments of thermal management systems with liquid cooling systems, the thermal management device sensors can include liquid cooling flowrate sensors. For example, if the environmental sensors indicate a rising temperature of one or more electronic devices, but environmental sensors also indicate that the temperature of the room is not rising significantly, the resource manager can collect information from the liquid cooling flowrate sensors to determine if the liquid cooling system is failing to carry thermal energy from the electronic devices to the atmosphere of the room.

In some embodiments, the datacenter thermal management telemetry can include the total available CFM of the thermal management system fans. The resource manager or other component of the thermal management system can access and use fan curve data to calculate the CFM of the air flow based on the RPM of the fans. The curve data is a table, graph, curve, or other dataset that correlates the RPM of a fan to the amount of air that is moved by the fan at that RPM. Therefore, the resource manager or operator controlling the RPM of the fan can adjust the RPM of the fan to match the supplied airflow to the demanded thermal management for the datacenter. Additionally, knowing the available airflow supply based on the curve data and status of the fans from the thermal management device sensors can allow the resource manager to adjust the thermal management demands, by adjusting the virtual machine and process allocation on the electronic devices based upon the priority lists described herein, to prevent overheating, data loss, or hardware damage in the event of a thermal management capacity reduction.

In some embodiments, the thermal management system determines a plurality of priority lists based on different types of thermal management capacity reductions. In some embodiments, the resource manager or operator can use the priority list differently based on different types of thermal management capacity reductions. For example, the priority list may provide resource manager or operator with an order in which to shut down processes to limit data loss and accelerate recovery after the thermal management capacity is restored. However, the priority list may be used to reduce the thermal energy generation of the electronic devices in a manner that is commensurate with the thermal management capacity reduction. In some embodiments, the resource manager or other device in communication with the resource manager calculates a percentage reduction in thermal management capacity and reduces power delivery includes reducing power delivery by a power delivery percentage that is at least the percentage reduction in thermal management capacity.

In some embodiments, the thermal management capacity reduction is gradual, such as on peak design temperature days when the external temperature gradually rises throughout the day. In at least one example, a datacenter in Arizona may have an expected window between 11 am and 3 pm when the external temperature is above 110° F. (43° C.), and the thermal management system cannot intake air below that temperature. In such an example, the thermal management capacity may be reduced during those hours of the day. In a particular example, the resource manager may determine that the external temperature reduces the thermal management capacity by approximately 30%, and the resource manager may reduce thermal energy generation and/or workload of the electronic devices by at least 30%. As the temperature rises slowly throughout the morning, the thermal management system may use the priority list to migrate the low-priority processes or storage to a second datacenter in another location to reduce the workload on the electronic devices of the datacenter during the hottest portion of the day. Because the migration of the processes can be done at a gradual rate as the thermal management capacity reduces gradually, the thermal management demand can be maintained commensurately to the thermal management supply.

In some embodiments, the thermal management capacity reduction is rapid, such as during a power failure to the fans of the thermal management system. In such an example, the thermal management device sensors can alert the resource manager or operator to an immediate reduction or loss in the thermal management capacity. When the thermal energy generation exceeds the thermal management capacity, the temperature will continue to rise in the datacenter until the processes and electronic devices begin to fail, or a complete shutdown is triggered. By responding quickly to the detected thermal management failure and/or loss in thermal management capacity, the thermal management demand (i.e., the thermal energy generation) can be adjusted commensurately with the thermal management capacity loss to prevent a rise in temperature.

In some embodiments, the resource manager or operator can determine or approximate the amount of the thermal management capacity lost by the power failure or other device failure. In response to the device failure and/or the calculated thermal management capacity lost, the resource manager or operator can begin shutting down processes and/or electronic devices to limit data loss and/or damage to the hardware while also establishing a foundation for more rapid recovery once the thermal management capacity is restored. In some embodiments, the resource manager or operator can, therefore, maintain the datacenter operating a lower capacity, with the thermal management demand and supply balanced, instead of the temperature climbing until a complete shutdown due to overheating.

The resource manager may automate adjustments to the workload of the electronic devices to change the thermal management demand (e.g., the thermal energy generation) of the electronic devices in response to a determined thermal management capacity. In other embodiments, the resource manager may provide information to an operator regarding a determined thermal management capacity and provide to the operator a priority list to allow the operator to migrate and/or shutdown processes to reduce thermal management demand.

In at least one embodiment, the resource manager or other computing device in data communication with the resource manager uses a machine learning (ML) model to dynamically create the priority list based on the types of processes and the relative amounts of processes in each predetermined priority tiers. In some embodiments, the resource manager or other computing device in data communication with the resource manager uses a ML model to dynamically create the priority list based on the types of processes in the datacenter, the relative amounts of processes in each predetermined priority tiers the process priority list and based on the hardware priority list. In some embodiments, the ML model can be used to determine the priority tiers.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is training using a plurality of known thermal management capacity reduction events.

In at least one embodiment, the resource manager or other computing device in data communication with the resource manager uses a ML model to dynamically calculate the thermal management capacity of the thermal management system based on information collected by/from the cooling sensors. In some embodiments, the resource manager or other computing device in data communication with the resource manager uses a ML model to predict the type of thermal management reduction or failure in order to anticipate how the thermal management supply will change or not over time. For example, based on information from the environmental sensors and thermal management device sensors, the ML model may allow the resource manager to identify similarities between changes in the received information from the cooling sensors and known thermal management capacity reduction events. The system may, then, be able to react through adjustments to the thermal management demands to prevent overheating of the system and maintain the thermal management demand commensurate with the thermal management supply.

In at least one embodiment, the resource manager or other computing device in data communication with the resource manager uses a ML model to dynamically adjust the thermal management demands to prevent overheating of the system and maintain the thermal management demand commensurate with the thermal management supply. In some embodiments, the resource manager or other computing device in data communication with the resource manager is in data communication with the electronic devices. The resource manager or other computing device in data communication with the resource manager can use a ML model to adjust the workload of the electronic devices to achieve a target thermal management demand, based on ML model being trained with inputs including the types of electronic devices, thermal energy generation of the electronic devices, the power consumption based on process and/or storage, and the priority list.

FIG. 1 is a schematic representation of a datacenter 100 with a thermal management system 102. An example environment in which thermal management systems and methods according to the present disclosure may be used is a server array. In some embodiments, the datacenter 100 includes server computers 104 arranged in a row 106, where the row contains a plurality of server racks 108, each of which contain at a plurality of server computers 104, power supplies 110, networking devices 112, and other electronic devices. In some examples, the server computer 104 is a blade server. In some examples, the server computers are complete computers (e.g., each server computer can function as a standalone computer). In some examples, the server computers 104 are electronic components that can cooperate to provide scalable computational power.

The server row 106 can include a row manager 114 that is in communication with the server racks and/or rack manager 116 of the server row 106. In some embodiments, the row manager 114 controls computational loads, such as process allocations, of the server racks 108 and/or server computers 104. In doing so, the row manager 114 may control the amount of heat generated by the server computers 104 of the server racks 108. In some embodiments, the row manager 114 controls thermal management of the server racks and/or server computers. For example, the row manager 114 can manage active thermal management for the server racks 108 and/or server computers 104 by changing fan speed or by controlling the flow rate of a cooling fluid for liquid cooling systems. In at least one example, the server row 106 is at least partially cooled by a liquid cooling system that delivers cooling fluid to the server racks 108 of the server row 106. The row manager 114 is in communication with the cooling fluid pump to change or stop the flow of cooling fluid.

A server rack 108 can support a plurality of server computers 104 in the rack. The server computers may each have liquid cooling, such as localized immersion cooling for at least some electronic components of the server computer, or a cooling plate with recirculating cooling fluid to cool the electronic component(s) of the server computer. In some embodiments, the server computers 104 or other electronic devices may be air-cooled, utilizing a cold aisle 118 and a hot aisle 120 that flow colder air 122 from the cold aisle 118 and evacuate hotter air 124 from the electronic devices through the hot aisle 120. The air flows from the cold aisle 118 to the hot aisle 120 based on air pressure differentials established by pumps or fans 126 of the thermal management system in series with the cold aisle 118 and the hot aisle 120.

In some embodiments, the electronic components, such as server computers 104, of the server rack 108 are in data communication with a rack manager 116. The rack manager 116 may control power delivery to the server computers 104 or other electronic components. In some embodiments, the rack manager 116 may communicate with the server computers 104 or other electronic components to power cap or throttle the server computers 104 or other electronic components and manage power draw. The rack manager 116, in some embodiments, is also in communication with a cooling fluid pump that moves cooling fluid to one or more server computers or other electronic components in the server rack.

A system resource manager 128 may be in data communication with the row manager 114 and/or rack manager(s) 116 to communicate with the electronic devices, as well as be in communication with cooling sensors 130, 132 to measure one or more properties of the thermal management system 102. In some embodiments, the system resource manager 128 includes a processor 129 and a hardware storage device 131. The processor 129 may receive information from the cooling sensors 130, 132 and communicate with one or more other devices according to instructions stored on the hardware storage device 131 that cause the processor to perform any of the methods described herein. In some embodiments, the devices in communication with the system resource manager 128 that may receive instructions from the system resource manager 128 in response to detecting a reduction in cooling capacity include a cooling fluid pump, fan, valve, or another thermal management device (e.g., fan 126), a power supply (e.g., 110) that provides power to electronic components, the electronic components and/or computing devices themselves (e.g., 104, 112), or other devices. For example, the system resource manager 128 may stop the flow of cooling fluid by turning off the cooling fluid pump or by actuating a valve. In other examples, the system resource manager 128 may send a signal to a power supply 110 for the server rack 108 or row 106 to turn off power to the electronic devices 104 in the rack 108 or row 106 to limit and/or prevent electrical damage due to the reduction in cooling capacity.

The hardware storage device 131 can be any non-transient computer readable medium that may store instructions thereon. The hardware storage device 131 may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media.

Figure 2:
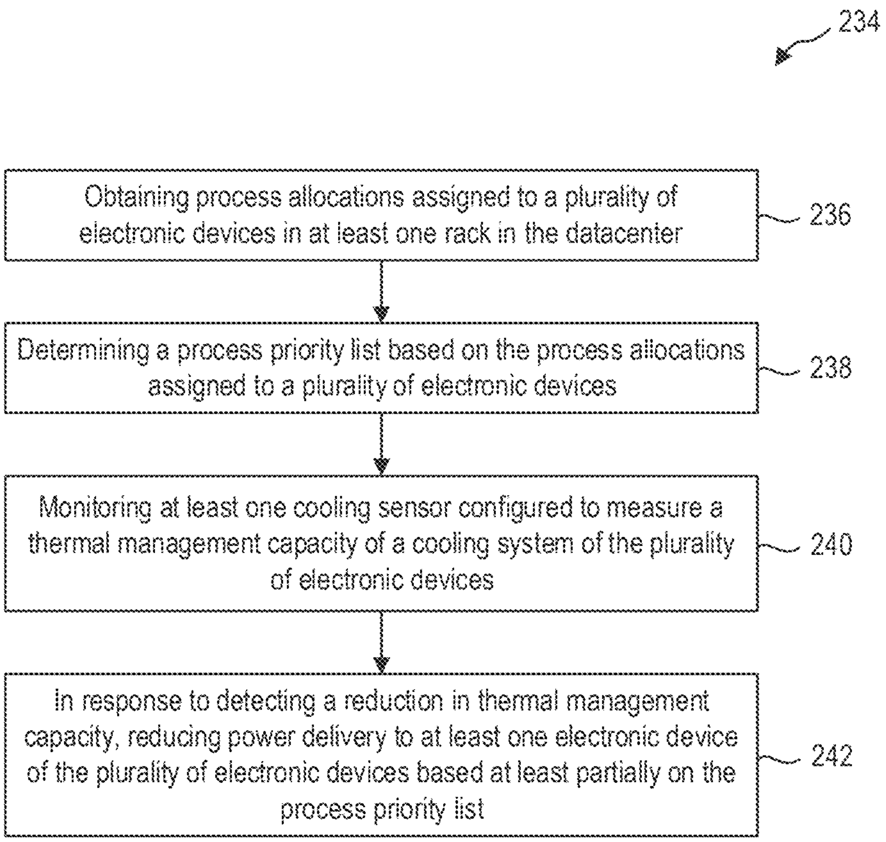
FIG. 2 is a flowchart illustrating a method of responding to a thermal management capacity reduction in a datacenter, according to at least some embodiments of the present disclosure.

FIG. 2 is a flowchart illustrating an embodiment of a method of balancing thermal management supply and demand, according to the present disclosure. In some embodiments, a method 234 of thermal management is performed by a resource manager or device in data communication with the resource manager and includes obtaining process allocations assigned to a plurality of electronic devices in at least one rack in the datacenter at 236. The resource manager or device in data communication with the resource manager may access a SKU document and/or process inventory to obtain the process allocations. Once the resource manager or device in data communication with the resource manager has obtained the active process (it should be understood that processes, as used herein, may include data storage) and devices to which the processes are allocated, the resource manager or device in data communication with the resource manager can access the workloads on the electronic devices associated with the process allocations.

The method 234 further includes determining a process priority list based on the process allocations assigned to a plurality of electronic devices. In some embodiments, the priority list is at least partially based upon a predetermined prioritization framework. The prioritization framework is a predetermined or operator selected framework that takes into account a plurality of factors to determine priority tiers of the active electronic devices (i.e., server computers, storage devices, power supplies, networking devices, etc.) for shutdown and/or startup. In at least one example, the prioritization framework includes the 3, 5, 7, or more priority tiers described herein. The prioritization framework may further include prioritization of process or storage migration versus process or storage shutdown when appropriate. As described herein, simply powering down a storage device does not ensure the data stored thereon will be safe from data loss due to thermal effects. In some embodiments, the prioritization framework may shutdown low-priority processes to allow migration of data storage before temperatures rise too much.

Referring still to FIG. 2, the method 234 includes monitoring at least one cooling sensor configured to measure a thermal management capacity of a cooling system of the plurality of electronic devices at 240. In some embodiments, a cooling sensor is an environmental sensor, such as a temperature sensor, humidity sensor, air pressure sensor, particulate sensor, or other sensor that measures a property of the air or environment in the datacenter. In some embodiments, the cooling sensor is a thermal management device sensor, which measure a property or performance of at least one thermal management device in the thermal management system.

An environmental sensor may measure an inlet temperature, which reflects the temperature of incoming air. An environmental sensor may measure an outlet temperature, which reflects the temperature of outgoing air. The temperature gradient between incoming and outgoing air may indicate the efficiency of thermal energy removal from the electronic devices of the datacenter. In some embodiments, the environmental sensor(s) includes an air pressure sensor or air pressure differential sensor to measure a difference in air pressure across a row or rack and/or between a cold aisle and a hot aisle. The air pressure differential can indicate the rate or mass of airflow through the row or rack and/or between the cold aisle and the hot aisle. In some embodiments, the environmental sensor includes a flowmeter to measure the amount of or rate of air flow through the row or rack and/or between the cold aisle and the hot aisle.

In some embodiments, the cooling sensor(s) according to the present disclosure includes thermal management device sensors. The thermal management device sensors may directly measure the performance and/or properties of components of the thermal management system. In contrast to the environmental sensors, the thermal management device sensors measure properties of the components of the thermal management system to inform a resource manager or operator of the performance of the components of the thermal management system independently of the temperature, humidity, air pressure, flowrate, etc. This can assist or allow the resource manager or operator to identify the source of or type of cooling capacity reduction or loss.

The method 234 further includes, in response to detecting a reduction in thermal management capacity, reducing power delivery to at least one electronic device of the plurality of electronic devices based at least partially on the process priority list at 242. In some embodiments, reducing the power delivery may be implemented by power capping the at least one electronic device via a rack manager or row manager. In some embodiments, reducing the power delivery may be implemented by shutting down the at least one electronic device. In some embodiments, reducing the power delivery may be implemented by migrating the process allocated to the at least one electronic device to another electronic device to limit or reduce the power consumption of the at least one electronic device. For example, the resource manager may move video processing from the at least one electronic device on a server rack experiencing reduced thermal management capacity to another electronic device on a second server rack that has surplus thermal management. The resource manager migrates or shuts down processes (and/or storage) based on the priority list to ensure that process and hardware dependencies are maintained, which allows for a faster recovery after the thermal management capacity is restored.

Figure 3:
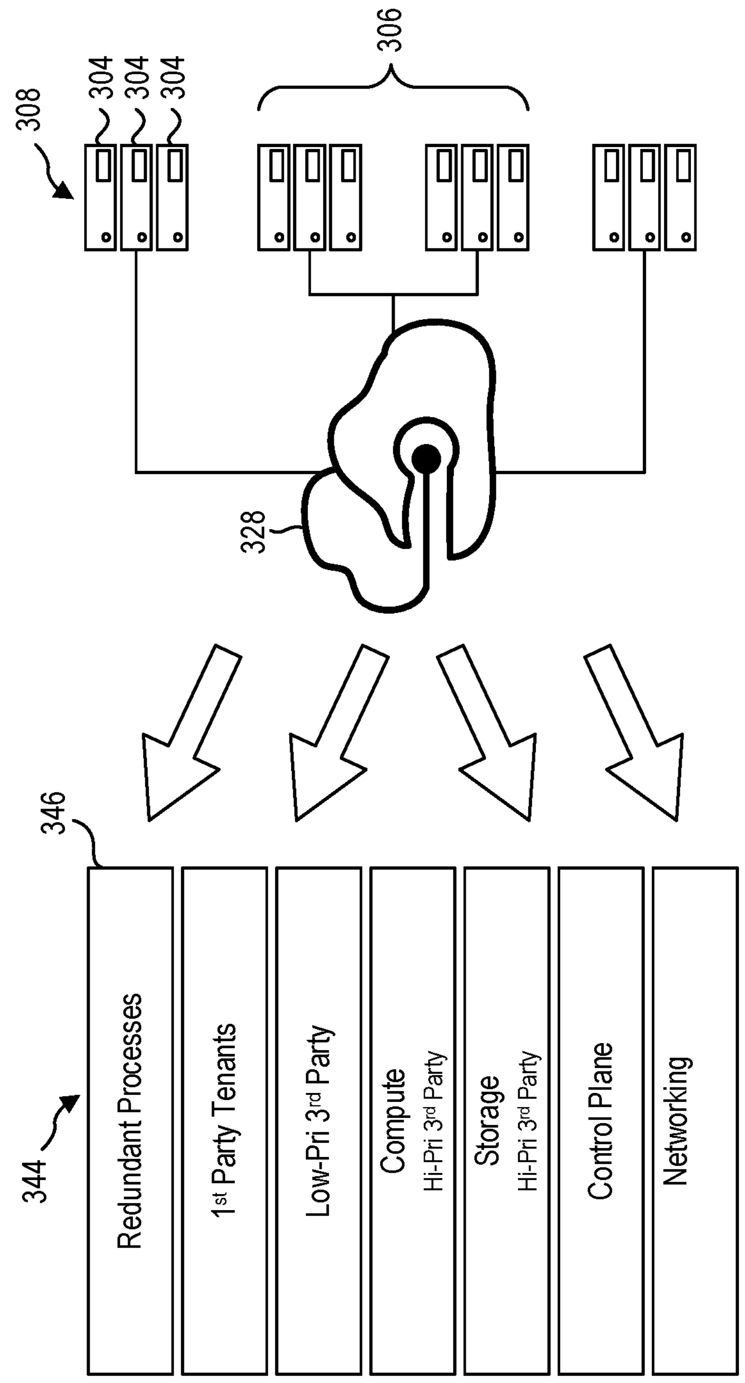
FIG. 3 is a schematic illustration of creating a priority list from processes through a prioritization framework, according to at least some embodiments of the present disclosure.

The reduction in power delivery to the at least one electronic device is performed based upon the priority list, which includes at least a process priority list, such as the embodiment illustrated in FIG. 3. In some embodiments, the resource manager 328 communicates with the server computers 304 and/or other electronic devices of the server row(s) 306 and/or server rack(s) 308 to determine process allocations. The resource manager 328 can prioritize the processes based upon the prioritization framework 344 that allows for a plurality of priority tiers 346.

In some examples, priority tiers 346 of the prioritization framework 344 and the process priority list include one or more of power supply and/or management, networking, control plane, storage, high priority third party computational, low priority third party computational, first party, and flexible or fluid redundant process. A redundant process is a process or set of processes that are hosted in the datacenter or across multiple datacenters that attempts to guarantee uptime and availability of the process for 99.9% or 99.999% of a given time period (typically per year). As redundant processes are commonly distributed across multiple racks, rows, or datacenters, inherent redundancy is engineered into the process to migrate or reallocate the processes to other racks, rows, or datacenters. In some embodiments, such flexible and/or fluid processes are considered the lowest priority for a controlled shutdown, as backup machines and locations are known to exist for those processes.

In some embodiments, first party computation and/or storage is considered a second-lowest priority. In embodiments where the datacenter is hosting a mixture of first- and third-party computation processes and/or data storage, the first party computation and/or storage may be considered lower priority than third party computation and/or storage. For example, a co-location datacenter may host third party computation and/or storage for contracted parties along with first party computation and/or storage for the owner or operator of the datacenter. The first party may be easier to notify and/or migrate the computation and/or storage to another rack, row, or datacenter because the first party is directly operating the datacenter. The third party has no control over the operations of the datacenter and trusts the first party to ensure the computation and/or storage of the contracted data. For that reason, third party computation and/or storage may be considered higher priority than the first party computation and/or storage.

In some embodiments, the third-party computation and/or storage is divided into two tiers to allow the third-party computation and/or storage to be handled more modularly, since a co-location datacenter may handle a large amount of third-party computation and/or storage. The low priority third-party computation and/or storage and the high priority third-party computation and/or storage may be designated based on the availability of migration or backup of the third-party computation and/or storage. For example, similarly to the redundant processes described herein, the low priority third-party computation and/or storage may include computation and/or storage that has known redundancy or backup. In that regard, a low priority or high priority designation may be related to availability of other machines and independent of the importance of the computation and/or storage.

The control plane is used to manage resources within an account or subscription in the datacenter. In some embodiments, the control plane is used to create a virtual machine or a storage account. As the control plane is the underlying system that allows for the allocation of computation and/or storage, the control plane may be considered of higher priority than the computation and/or storage tiers.

In some embodiments, networking is the highest priority tier in the process priority list (aside from power delivery and management) as all computation and/or storage processes and operations depend upon the networking of the virtual machines and storage to operate. In some embodiments, power delivery and power management devices are not included in the process priority list because no processes are possible without power delivered to the electronic devices, and hence may be considered of threshold priority (e.g., higher priority that any process) because power delivery and management must happen for any of the other process priority tiers to be available.

Figure 4:
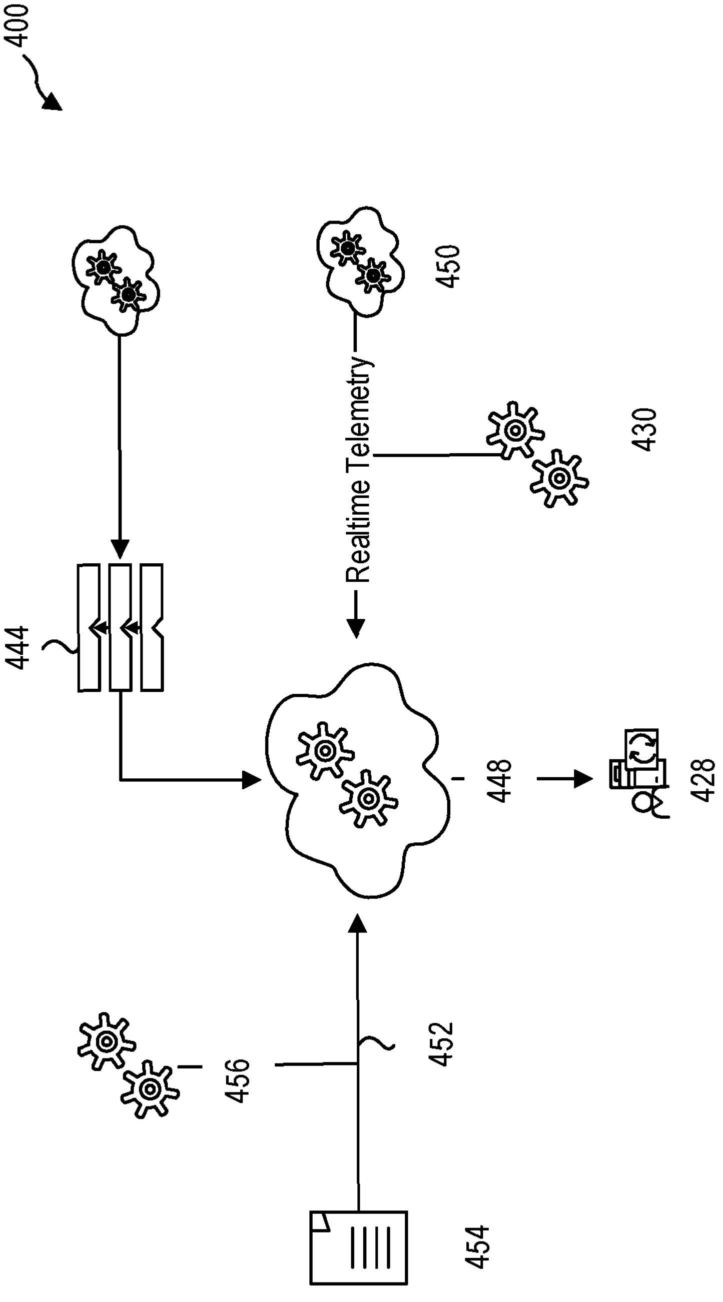
FIG. 4 is a schematic diagram of the interactions and communications between the operations and thermal management of the datacenter, according to at least some embodiments of the present disclosure.

FIG. 4 is a schematic diagram of the interactions and communications between the operations and thermal management of the datacenter 400. In some embodiments, a cooling priority service 448 receives information regarding electronic device workloads, cooling telemetry, and device inventory to balance thermal management supply and demand. In some embodiments, the cooling priority service 448, which may run on the resource manager as described herein, receives information from cooling sensors such as in-rack telemetry 430 or infrastructure health sensors 450. The real-time telemetry of the thermal management system can include environmental information and/or thermal management device information, as describe herein. The real-time telemetry of the thermal management system from the cooling sensors can allow the cooling priority service 448 of the resource manager to determine the available thermal management capacity of the datacenter 400.

The cooling priority service 448 also obtains IT inventory information 452 from the SKU document 454 and the inventory service 456. The IT inventory information 452 allows the cooling priority service 448 to know what the power demands, and hence thermal management demands, are for the datacenter 400. The resource central is used to augment the prioritization framework 444 with a workflow profile and the output is presented to the cooling priority service 448 to determine the priority list. The cooling priority service 448 can determine the thermal management supply and demand in context of the IT inventory, the telemetry from the cooling sensors, and the dependencies and workloads through the prioritization framework. In the same manner, the IT inventory information 452 allows the cooling priority service 448 to determine where (e.g., which heat-generating components) a controlled shutdown or power capping should occur to maximize the efficiency of any reduction in the thermal management demand.

In some embodiments, low priority processes and storage can be migrated or shut down to lessen the impact of thermal management capacity reductions. In some embodiments, the impact to high-priority processes and storage can be limited or entirely prevented without completely shutting down a rack or row of the datacenter. In some embodiments, the thermal management capacity reduction is gradual, such as on peak design temperature days when the external temperature gradually rises throughout the day. Because the migration of the processes can be done at a gradual rate as the thermal management capacity reduces gradually, the thermal management demand can be maintained commensurately to the thermal management supply.

In some embodiments, the thermal management capacity reduction is rapid, such as during a power failure to the fans of the thermal management system. In such an example, the thermal management device sensors can alert the cooling priority service 448 of the resource manager or operator to an immediate reduction or loss in the thermal management capacity. When the thermal energy generation exceeds the thermal management capacity, the temperature will continue to rise in the datacenter until the processes and electronic devices begin to fail, or a complete shutdown is triggered. By responding quickly to the detected thermal management failure and/or loss in thermal management capacity, the thermal management demand (i.e., the thermal energy generation) can be adjusted commensurately with the thermal management capacity loss to prevent a rise in temperature.

In some embodiments, the resource manager or operator can determine or approximate the amount of the thermal management capacity lost by the power failure or other device failure. In response to the device failure and/or the calculated thermal management capacity lost, the cooling priority service 448 of the resource manager or operator can begin shutting down processes and/or electronic devices to limit data loss and/or damage to the hardware while also establishing a foundation for more rapid recovery once the thermal management capacity is restored. In some embodiments, the resource manager or operator can, therefore, maintain the datacenter operating a lower capacity, with the thermal management demand and supply balanced, instead of the temperature climbing until a complete shutdown due to overheating.

The resource manager may automate adjustments to the workload of the electronic devices to change the thermal management demand (e.g., the thermal energy generation) of the electronic devices in response to a determined thermal management capacity. In other embodiments, the resource manager may provide information to an operator regarding a determined thermal management capacity and provide to the operator a priority list to allow the operator to migrate and/or shutdown processes to reduce thermal management demand.

INDUSTRIAL APPLICABILITY

The present disclosure relates generally to systems and methods for protecting electronic devices from thermal damage. More particularly, the present disclosure relates to devices, systems, and methods for balancing supply and demand of thermal management and workload in a datacenter. In conventional datacenters, electronic devices are shut down, throttled, disabled, or otherwise limited in response to reductions in thermal management capacity of the datacenter. However, the type of workload on different electronic devices may be of different value to the datacenter, and the thermal energy generation of different electronic devices may be different relative to their value to the datacenter. In some embodiments, systems and methods of datacenter workload and thermal management limit and/or prevent impact to the processing and communication capabilities of the datacenter when a reduction in thermal management capacity occurs.

Datacenters include a plurality of electronic devices, some of which are computing devices and some of which are not, that all generate thermal energy. The thermal energy needs to be transported away from the electronic devices to prevent damage to the electronic devices and/or protect the integrity of the data stored or computed on the electronic devices. Datacenters user thermal management systems to carry thermal energy away from the electronic devices by liquid cooling, air cooling, or a combination thereof. Even in liquid cooled systems, the liquid cooling may efficiently conduct thermal energy from the electronic devices but ultimately reject the thermal energy from the warmed liquid (or vapor) into the ambient atmosphere. The warmed ambient air must then be moved from the liquid cooling system and/or the electronic devices to complete the thermal management of the electronic devices.

In some embodiments of datacenters and thermal management systems according to the present disclosure, a plurality of heat generating devices are located in an enclosed space and air is moved within the space to transfer heat from the heat-generating devices to cool the heat-generating devices. While the present disclosure will describe the use of airflow to cool heat-generating devices directly, such as cooling computing devices, hardware storage devices, networking devices, power supplies, and other electronic devices, it should be understood that the thermal management system may use airflow to cool heat sinks of liquid cooling systems that conduct thermal energy away from the electronic devices. In either example, the reduction of thermal management capacity may be related to a reduction in airflow or air pressure differential across the thermal management system. In the liquid-cooled example, a reduction of thermal management capacity can also be a reduction in liquid flow, such as a failed cooling fluid pump or a blockage in the cooling fluid conduit(s). In either example, a method of reducing workload of the electronic devices in response to a detected reduction in thermal management capacity may be the same.

In some embodiments, a thermal management system according to the present disclosure includes communication between the electronic devices of the datacenter, the thermal management devices of the datacenter, and one or more cooling sensors of the datacenter to balance the supply and demand of thermal management within the datacenter while minimizing impacts to the processing and storage capabilities of the datacenter when a reduction in cooling capacity is detected. The thermal management system communicates with the electronic devices of the datacenter to create and dynamically maintain one or more priority lists for shutdown or restoration of electronic device workload. The priority lists can include a process priority list where higher value or foundational processes upon which other processes depend are granted a higher priority and kept running while other processes are shut down. The priority lists can include a hardware priority list in which an electronic device that is more susceptible to thermal damage may be shut down before (and restored after) another electronic device that can safely continue operating in elevated temperatures. For example, a power supply may be able to continue operating safely at higher temperatures (e.g., above 90° C.) than a computing device, which may experience damage to the processors at the same or lower temperatures (e.g., about 80° C.).

The electronic device workload should be understood to be any electronic processes that generate thermal energy. For example, the electronic device workload of a computing device includes computational workload. A reduction in electronic device workload of the computing device can include shutting down the computing device to substantially stop the computational workload or throttling the processors of the computing device to reduce the possible computational workload. In another example, the electronic device workload of a power supply includes power conversion and/or deliver to another electronic device. A reduction in electronic device workload of the power supply can include shutting down the power supply to substantially stop the power supply workload or reducing the power demand on the power supply (e.g., shutting down server blades powered by the power supply) to reduce the power supply workload. The electronic device workload is related to the thermal energy generation of the electronic device, but each electronic device may generate different amounts of the thermal energy relative to a respective power draw. For example, a first computing device may generate more thermal energy while drawing 500W than a second computing device while drawing 500W.

The thermal management system balances the thermal energy generation of the electronic devices with the cooling capacity of the thermal management system according to the priority list(s). The cooling capacity of the thermal management system is related to the location and capacity of a plurality of thermal management devices in the system.

In some embodiments, the thermal management system determines the cooling capacity directly through communication with the thermal management devices. In some embodiments, the thermal management system determines the cooling capacity of the thermal management system through indirect measurements from cooling sensors. For example, the cooling sensors may include air pressure sensors used to measure an air pressure differential between a hot aisle and a cold aisle of the datacenter. In some examples, the cooling sensors include temperature sensors in or on the electronic devices. In some examples, the cooling sensors include temperature sensors in or on the racks housing the electronic devices. In some examples, the cooling sensors include temperature sensors in the rooms of the datacenter to measure ambient temperatures in the datacenter. In some examples, the cooling sensors include temperature sensors in the hot and/or cold aisle to measure temperature and/or temperature differentials.

In some embodiments, the cooling sensors further include environmental sensors that do not measure the cooling capacity but measure additional environmental factors that affect the priority list for shutting down electronic device workload or restoring electronic device workload. For example, an environmental sensor may be a humidity sensor that measures the ambient humidity at or near the electronic components. The humidity can inform the thermal management system of condensation risks during temperature changes in the datacenter. While ambient humidity has comparatively little impact on the thermal management of the electronic devices during operation, condensation during more rapid changes in temperature can produce droplets, which can short the electronic devices.

In some embodiments, a method of thermal management according to the present disclosure includes a process priority list based on a process inventory of the known processes running on the computing devices. Additionally, the system inventory can include a device inventory that includes device dependency information for electronic devices in the system. For example, a an IT inventory accessible by a resource manager may include information regarding the device dependencies between computing devices and power supplies where the computing devices depend upon the power supplies for electrical power. In another example, the device dependencies may include networking devices and computing devices where the computing devices depend upon the networking devices for communication with a network. The process priority list may consider device dependency information to determine what computing, storage, networking, power supply, or other processes to prioritize in operations over other processes. A SKU document accessible by the resource manager may contain power and cooling expectations for a given device. In at least one embodiment, the SKU document contains curve data for thermal management devices of the thermal management system.

The process priority list may be classified by tiers to allow faster and easier identification of relative priorities. In some embodiments, the process priority list may include at least 3 tiers. In some embodiments, the process priority list may include at least 5 tiers. In some embodiments, the process priority list may include at least 7 tiers.

In some examples, tiers of the process priority list include one or more of power supply and/or management, networking, control plane, storage, high priority third party computational, low priority third party computational, first party, and flexible or fluid redundant processes. A redundant process is a process or set of processes that are hosted in the datacenter or across multiple datacenters that attempts to guarantee uptime and availability of the process for 99.9% or 99.999% of a given time period (typically per year). As redundant processes are commonly distributed across multiple racks, rows, or datacenters, inherent redundancy is engineered into the process to migrate or reallocate the processes to other racks, rows, or datacenters. In some embodiments, such flexible and/or fluid processes are considered the lowest priority for a controlled shutdown, as backup machines and locations are known to exist for those processes.

In some embodiments, first party computation and/or storage is considered a second-lowest priority. In embodiments where the datacenter is hosting a mixture of first- and third-party computation processes and/or data storage, the first party computation and/or storage may be considered lower priority than third party computation and/or storage. For example, a co-location datacenter may host third party computation and/or storage for contracted parties along with first party computation and/or storage for the owner or operator of the datacenter. The first party may be easier to notify and/or migrate the computation and/or storage to another rack, row, or datacenter because the first party is directly operating the datacenter. The third party has no control over the operations of the datacenter and trusts the first party to ensure the computation and/or storage of the contracted data. For that reason, third party computation and/or storage may be considered higher priority than the first party computation and/or storage.

In some embodiments, the third-party computation and/or storage is divided into two tiers to allow the third-party computation and/or storage to be handled more modularly, since a co-location datacenter may handle a large amount of third-party computation and/or storage. The low priority third-party computation and/or storage and the high priority third-party computation and/or storage may be designated based on the availability of migration or backup of the third-party computation and/or storage. For example, similarly to the redundant processes described herein, the low priority third-party computation and/or storage may include computation and/or storage that has known redundancy or backup. In that regard, a low priority or high priority designation may be related to availability of other machines and independent of the importance of the computation and/or storage.

The control plane is used to manage resources within an account or subscription in the datacenter. In some embodiments, the control plane is used to create a virtual machine or a storage account. As the control plane is the underlying system that allows for the allocation of computation and/or storage, the control plane may be considered of higher priority than the computation and/or storage tiers.

In some embodiments, networking is the highest priority tier in the process priority list (aside from power delivery and management) as all computation and/or storage processes and operations depend upon the networking of the virtual machines and storage to operate. In some embodiments, power delivery and power management devices are not included in the process priority list because no processes are possible without power delivered to the electronic devices, and hence may be considered of threshold priority (e.g., higher priority that any process) because power delivery and management must happen for any of the other process priority tiers to be available.

The hardware priority list may include power delivery and management, as the power supplies and power management devices may be selectively shutdown or restricted in relation to available cooling capacity and/or susceptibility to thermal damage in the event of a cooling capacity reduction or loss. For example, operating the power supplies and/or power management devices in an elevated temperature environment may damage the power supplies and/or power management devices. In particular, power supplies and/or power management devices commonly generate a large amount of heat. The power supplies and/or power management devices may rise in temperature rapidly in the absence of sufficient thermal management, causing damage to the power supplies and/or power management devices that limits and/or prevents the operation of dependent devices.

In some embodiments, the hardware priority list includes thermal susceptibility information for some or all electronic devices in the datacenter that are cooled by the thermal management system. For example, whereas third-party high priority storage may be a relatively high priority tier of the process priority list, some of the third-party high priority storage may occur on hardware that is susceptible to thermal damage. In at least one example, a solid-state drive (SSD) may experience data corruption at elevated temperatures, even before the hardware fails. In some embodiments, the hardware priority list may indicate to the system and/or initiate a process to migrate the third-party high priority storage to another storage device (e.g., platen-based magnetic storage) that is less thermally susceptible before the SSD rises above a pre-determined critical temperature for data integrity.

In some embodiments, the hardware priority list includes humidity and/or moisture susceptibility information for some or all electronic devices in the datacenter that are cooled by the thermal management system. In some embodiments, one or more of the electronic devices is more susceptible to moisture or humidity damage than other devices. As described herein, rapid changes in temperature and/or humidity in the datacenter can produce condensation or other moisture in or on the electronic devices. In some examples, a liquid-cooled electronic device may be substantially waterproof to protect against leaks from the liquid cooling system. In such examples, those devices may be positioned lower on a hardware priority list than other electronic devices that are more vulnerable to liquid damage from condensation.

The hardware priority list and the process priority list, in some embodiments, agree and order the device priorities during a thermal management capacity reduction or failure the same. In some embodiments, the hardware priority list prioritizes the shutdown (or powering on) of certain electronic devices in a different order than the process priority list. In such embodiments, the hardware priority list and the process priority list are synthesized into a single dynamic priority list, in which the processes are prioritized in context of the hardware upon which the processes run. For example, the dynamic priority list can prioritize the processes based on the designated priority tiers (e.g., the 7 tiers described herein, or another set of priority tiers) unless the priority of the processes conflicts with the dependencies or the hardware priority list. In some embodiments, the dependencies include process dependencies (although most process dependencies are factored into the process priority list) and device dependencies.

Because many processes can be allocated to different virtual machines quickly and may be distributed between multiple machines, the system changes too quickly for a person or persons to track. While the priority tiers may be predetermined, the actual dynamic priority list will change the priority of certain processes based on the device to which the process is allocated. In some embodiments, the dynamic priority list changes based on the type of thermal management capacity reduction.

In some embodiments, the dynamic priority list is determined and dynamically modified by a resource manager in data communication with one or more row managers, rack managers, cooling sensors, thermal management devices, and other electronic devices of the datacenter. The resource manager can receive datacenter telemetry to determine the demands of the thermal management system. The datacenter telemetry can include information about the thermal management system performance and/or cooling capacity. The information about the thermal management system performance and/or cooling capacity can originate from one or more cooling sensors. In some embodiments, a cooling sensor is an environmental sensor, such as a temperature sensor, humidity sensor, air pressure sensor, particulate sensor, or other sensor that measures a property of the air or environment in the datacenter. In some embodiments, the cooling sensor is a thermal management device sensor, which measure a property or performance of at least one thermal management device in the thermal management system.

An environmental sensor may measure an inlet temperature, which reflects the temperature of incoming air. An environmental sensor may measure an outlet temperature, which reflects the temperature of outgoing air. The temperature gradient between incoming and outgoing air may indicate the efficiency of thermal energy removal from the electronic devices of the datacenter. In some embodiments, the environmental sensor(s) includes an air pressure sensor or air pressure differential sensor to measure a difference in air pressure across a row or rack and/or between a cold aisle and a hot aisle. The air pressure differential can indicate the rate or mass of airflow through the row or rack and/or between the cold aisle and the hot aisle. In some embodiments, the environmental sensor includes a flowmeter to measure the amount of or rate of air flow through the row or rack and/or between the cold aisle and the hot aisle.

In some embodiments, the cooling sensor(s) according to the present disclosure includes thermal management device sensors. The thermal management device sensors may directly measure the performance and/or properties of components of the thermal management system. In contrast to the environmental sensors, the thermal management device sensors measure properties of the components of the thermal management system to inform a resource manager or operator of the performance of the components of the thermal management system independently of the temperature, humidity, air pressure, flowrate, etc. This can assist or allow the resource manager or operator to identify the source of or type of cooling capacity reduction or loss.

For example, if the thermal management device sensors indicate that the fan(s) of the thermal management system is operating at an expected revolutions per minute (RPM), but the environmental sensors indicate a reduction in pressure differential and/or flowrate, a blockage in the airflow to or from the fan(s) is likely. In another example, if the environmental sensors indicate a rising temperature at a server rack, and the thermal management device sensors indicate that one of a plurality of fans of the thermal management system has stopped, the resource manager can determine the amount of reduction in thermal management capacity based upon the known loss in airflow supply. In embodiments of thermal management systems with liquid cooling systems, the thermal management device sensors can include liquid cooling flowrate sensors. For example, if the environmental sensors indicate a rising temperature of one or more electronic devices, but environmental sensors also indicate that the temperature of the room is not rising significantly, the resource manager can collect information from the liquid cooling flowrate sensors to determine if the liquid cooling system is failing to carry thermal energy from the electronic devices to the atmosphere of the room.

In some embodiments, the datacenter thermal management telemetry can include the total available CFM of the thermal management system fans. The resource manager or other component of the thermal management system can access and use fan curve data to calculate the CFM of the air flow based on the RPM of the fans. The curve data is a table, graph, curve, or other dataset that correlates the RPM of a fan to the amount of air that is moved by the fan at that RPM. Therefore, the resource manager or operator controlling the RPM of the fan can adjust the RPM of the fan to match the supplied airflow to the demanded thermal management for the datacenter. Additionally, knowing the available airflow supply based on the curve data and status of the fans from the thermal management device sensors can allow the resource manager to adjust the thermal management demands, by adjusting the virtual machine and process allocation on the electronic devices based upon the priority lists described herein, to prevent overheating, data loss, or hardware damage in the event of a thermal management capacity reduction.

In some embodiments, the thermal management system determines a plurality of priority lists based on different types of thermal management capacity reductions. In some embodiments, the resource manager or operator can use the priority list differently based on different types of thermal management capacity reductions. For example, the priority list may provide resource manager or operator with an order in which to shut down processes to limit data loss and accelerate recovery after the thermal management capacity is restored. However, the priority list may be used to reduce the thermal energy generation of the electronic devices in a manner that is commensurate with the thermal management capacity reduction.

In some embodiments, the thermal management capacity reduction is gradual, such as on peak design temperature days when the external temperature gradually rises throughout the day. In at least one example, a datacenter in Arizona may have an expected window between 11 am and 3 pm when the external temperature is above 110° F. (43° C.), and the thermal management system cannot intake air below that temperature. In such an example, the thermal management capacity may be reduced during those hours of the day. As the temperature rises slowly throughout the morning, the thermal management system may use the priority list to migrate the low-priority processes or storage to a second datacenter in another location to reduce the workload on the electronic devices of the datacenter during the hottest portion of the day. Because the migration of the processes can be done at a gradual rate as the thermal management capacity reduces gradually, the thermal management demand can be maintained commensurately to the thermal management supply.

In some embodiments, the thermal management capacity reduction is rapid, such as during a power failure to the fans of the thermal management system. In such an example, the thermal management device sensors can alert the resource manager or operator to an immediate reduction or loss in the thermal management capacity. When the thermal energy generation exceeds the thermal management capacity, the temperature will continue to rise in the datacenter until the processes and electronic devices begin to fail, or a complete shutdown is triggered. By responding quickly to the detected thermal management failure and/or loss in thermal management capacity, the thermal management demand (i.e., the thermal energy generation) can be adjusted commensurately with the thermal management capacity loss to prevent a rise in temperature.

In some embodiments, the resource manager or operator can determine or approximate the amount of the thermal management capacity lost by the power failure or other device failure. In response to the device failure and/or the calculated thermal management capacity lost, the resource manager or operator can begin shutting down processes and/or electronic devices to limit data loss and/or damage to the hardware while also establishing a foundation for more rapid recovery once the thermal management capacity is restored. In some embodiments, the resource manager or operator can, therefore, maintain the datacenter operating a lower capacity, with the thermal management demand and supply balanced, instead of the temperature climbing until a complete shutdown due to overheating.

The resource manager may automate adjustments to the workload of the electronic devices to change the thermal management demand (e.g., the thermal energy generation) of the electronic devices in response to a determined thermal management capacity. In other embodiments, the resource manager may provide information to an operator regarding a determined thermal management capacity and provide to the operator a priority list to allow the operator to migrate and/or shutdown processes to reduce thermal management demand.

In at least one embodiment, the resource manager or other computing device in data communication with the resource manager uses a machine learning (ML) model to dynamically create the priority list based on the types of processes and the relative amounts of processes in each predetermined priority tiers. In some embodiments, the resource manager or other computing device in data communication with the resource manager uses a ML model to dynamically create the priority list based on the types of processes in the datacenter, the relative amounts of processes in each predetermined priority tiers the process priority list and based on the hardware priority list. In some embodiments, the ML model can be used to determine the priority tiers.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is training using a plurality of known thermal management capacity reduction events.

In at least one embodiment, the resource manager or other computing device in data communication with the resource manager uses a ML model to dynamically calculate the thermal management capacity of the thermal management system based on information collected by/from the cooling sensors. In some embodiments, the resource manager or other computing device in data communication with the resource manager uses a ML model to predict the type of thermal management reduction or failure in order to anticipate how the thermal management supply will change or not over time. For example, based on information from the environmental sensors and thermal management device sensors, the ML model may allow the resource manager to identify similarities between changes in the received information from the cooling sensors and known thermal management capacity reduction events. The system may, then, be able to react through adjustments to the thermal management demands to prevent overheating of the system and maintain the thermal management demand commensurate with the thermal management supply.

In at least one embodiment, the resource manager or other computing device in data communication with the resource manager uses a ML model to dynamically adjust the thermal management demands to prevent overheating of the system and maintain the thermal management demand commensurate with the thermal management supply. In some embodiments, the resource manager or other computing device in data communication with the resource manager is in data communication with the electronic devices. The resource manager or other computing device in data communication with the resource manager can use a ML model to adjust the workload of the electronic devices to achieve a target thermal management demand, based on ML model being trained with inputs including the types of electronic devices, thermal energy generation of the electronic devices, the power consumption based on process and/or storage, and the priority list.

The present disclosure relates to systems and methods for balancing thermal management and workloads in a datacenter according to at least the examples provided in the sections below:

(A1) In some embodiments, a method of responding to a thermal management capacity reduction in a datacenter includes obtaining process allocations assigned to a plurality of electronic devices in the datacenter and determining a process priority list based on the process allocations assigned to the plurality of electronic devices. The method further includes monitoring at least one cooling sensor configured to measure a thermal management capacity of a cooling system of the plurality of electronic devices and, in response to detecting a reduction in thermal management capacity, reducing power delivery to at least one electronic device of the plurality of electronic devices based at least partially on the process priority list.

(A2) In some embodiments, a method of responding to a thermal management capacity reduction in a datacenter, such as described in (A1), includes collecting hardware identifications for the plurality of electronic devices.

(A3) In some embodiments, a method of responding to a thermal management capacity reduction in a datacenter includes collecting hardware identifications for the plurality of electronic devices and the hardware identifications include thermal susceptibility information.

(A4) In some embodiments, reducing power delivery to at least one electronic device in a method such as that described in relation to (A2) is further based on the hardware identifications.

(A5) In some embodiments, reducing power delivery to at least one electronic device in a method such as that described in relation to (A1) includes power capping at least one electronic device.

(A6) In some embodiments, reducing power delivery to at least one electronic device in a method such as that described in relation to (A1) includes shutting down at least one electronic device.

(A7) In some embodiments, determining a process priority list, such as in the method described in (A1), includes using a machine learning model that is at least partially trained using known thermal management capacity reduction events.

(A8) In some embodiments, determining a process priority list, such as in the method described in (A1), includes determining a plurality of process priorities lists where different process priority lists are associated with different types of thermal management capacity reductions.

(A9) In some embodiments, a method of responding to a thermal management capacity reduction in a datacenter, such as described in (A1), includes determining a hardware priority list based upon thermal susceptibility of at least two of the electronic devices of the plurality of electronic devices.

(A10) In some embodiments, the method of (A9) further includes creating a priority list based on dependencies between the process priority list and the hardware priority list.

(A11) In some embodiments, detecting a reduction in thermal management capacity, such as described in (A1), includes calculating a percentage reduction in thermal management capacity and wherein reducing power delivery includes reducing power delivery by a power delivery percentage that is at least the percentage reduction in thermal management capacity.

(B1) In some embodiments, a system for responding to a thermal management capacity reduction in a datacenter includes a plurality of electronic devices, at least one cooling sensor, a rack manager, and a controller in communication with the rack manager and the at least one cooling sensor. The plurality of electronic devices generates thermal energy. The at least one cooling sensor measures a thermal management capacity of a cooling system of the plurality of electronic devices. The rack manager is in communication with the plurality of electronic devices. The controller includes a processor and a hardware storage device that has instruction stored thereon that, when executed by the processor, cause the controller to perform at least one of the methods described in (A1) through (A11).

(B2) In some embodiments, the at least one cooling sensor of (B1) includes a temperature sensor configured to measure a temperature at a location proximate the plurality of electronic devices.

(B3) In some embodiments, the at least one cooling sensor of (B1) includes a fan speed sensor.

(B4) In some embodiments, the at least one cooling sensor of (B1) includes a flowrate sensor positioned and configured to measure a flowrate of cooling fluid past the plurality of electronic devices.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of responding to a thermal management capacity reduction in a datacenter, the method comprising:

obtaining process allocations assigned to a plurality of electronic devices in the datacenter;

collecting hardware identifications for the plurality of electronic devices, wherein the hardware identifications include thermal susceptibility information of the electronic devices of the plurality of electronic devices, the thermal susceptibility information including a critical temperature at which the electronic devices of the plurality of electronic devices experience damage;

determining a process priority list based on the process allocations assigned to the plurality of electronic devices;

monitoring at least one cooling sensor configured to measure a thermal management capacity of a cooling system of the plurality of electronic devices; and in response to detecting a reduction in thermal management capacity, reducing power delivery to at least one electronic device of the plurality of electronic devices based on the process priority list and the thermal susceptibility information.

2. The method of claim 1, wherein reducing power delivery includes power capping at least one electronic device.

3. The method of claim 1, wherein reducing power delivery includes shutting down at least one electronic device.

4. The method of claim 1, wherein reducing power delivery to at least one electronic device is further based on the hardware identifications.

5. The method of claim 1, wherein reducing power delivery includes power capping at least one electronic device.

6. The method of claim 1, wherein reducing power delivery includes shutting down at least one electronic device.

7. The method of claim 1, wherein determining a process priority list includes using a machine learning model that is at least partially trained using known thermal management capacity reduction events.

8. The method of claim 1, wherein determining a process priority list includes determining a plurality of process priorities lists where different process priority lists are associated with different types of thermal management capacity reductions.

9. The method of claim 1, further comprising determining a hardware priority list based upon thermal susceptibility of at least two of the electronic devices of the plurality of electronic devices.

10. The method of claim 9, further comprising creating a priority list based on dependencies between the process priority list and the hardware priority list.

11. The method of claim 1, wherein detecting a reduction in thermal management capacity includes calculating a percentage reduction in thermal management capacity and wherein reducing power delivery includes reducing power delivery by a power delivery percentage that is at least the percentage reduction in thermal management capacity.

12. The method of claim 4, wherein reducing power delivery includes power capping at least one electronic device.

13. The method of claim 4, wherein reducing power delivery includes shutting down at least one electronic device.

14. The method of claim 1, wherein determining a process priority list includes using a machine learning model that is at least partially trained using known thermal management capacity reduction events.

15. A system for responding to a thermal management capacity reduction in a datacenter, the system comprising:

a plurality of electronic devices that generate thermal energy;

at least one cooling sensor configured to measure a thermal management capacity of a cooling system of the plurality of electronic devices;

a rack manager in communication with the plurality of electronic devices;

a controller in communication with the rack manager and the at least one cooling sensor, the controller including:

a processor, and a hardware storage device having instructions stored thereon that, when executed by the processor, cause the controller to:

obtaining process allocations assigned to a plurality of electronic devices in the datacenter;

collecting hardware identifications for the plurality of electronic devices, wherein the hardware identifications include thermal susceptibility information of the electronic devices of the plurality of electronic devices, the thermal susceptibility information including a critical temperature at which the electronic devices of the plurality of electronic devices experience damage;

determining a process priority list based on the process allocations assigned to the plurality of electronic devices;

monitoring at least one cooling sensor configured to measure a thermal management capacity of a cooling system of the plurality of electronic devices; and in response to detecting a reduction in thermal management capacity, reducing power delivery to at least one electronic device of the plurality of electronic devices based on the process priority list and the thermal susceptibility information.

16. The system of claim 15, wherein the at least one cooling sensor includes a temperature sensor configured to measure a temperature at a location proximate the plurality of electronic devices.

17. The system of claim 15, wherein the at least one cooling sensor includes a fan speed sensor.

18. The system of claim 12, wherein the at least one cooling sensor includes a flowrate sensor positioned and configured to measure a flowrate of cooling fluid past the plurality of electronic devices.

* * * * *